United States Patent
Holeman et al.

(10) Patent No.: US 9,211,929 B1
(45) Date of Patent: Dec. 15, 2015

(54) PROTECTIVE COVER FOR MOTORCYCLE FAIRING

(71) Applicant: Novigo Designs, LLC, Newark, DE (US)

(72) Inventors: Andrew S. Holeman, Newark, DE (US); Harold D. Holeman, Newark, DE (US)

(73) Assignee: Novigo Designs, LLC, Newark, DE (US)

( * ) Notice: Subject to any disclaimer, the term of this patent is extended or adjusted under 35 U.S.C. 154(b) by 0 days.

(21) Appl. No.: 14/468,458

(22) Filed: Aug. 26, 2014

Related U.S. Application Data

(60) Provisional application No. 61/876,249, filed on Sep. 11, 2013.

(51) Int. Cl.
*B62J 17/00* (2006.01)
*B62J 23/00* (2006.01)
*B62J 17/02* (2006.01)

(52) U.S. Cl.
CPC . *B62J 23/00* (2013.01); *B62J 17/02* (2013.01)

(58) Field of Classification Search
CPC ............ B62J 17/02; B62J 17/00; B62J 23/00; B62J 17/04
USPC ........... 280/762, 770; 296/77.1, 78.1, 136.08, 296/136.01, 95.1; 150/166, 167
See application file for complete search history.

(56) References Cited

U.S. PATENT DOCUMENTS

| | | | | |
|---|---|---|---|---|
| 5,458,945 A * | 10/1995 | Tall | ................................ | 428/100 |
| 5,562,139 A * | 10/1996 | Cseri | ............................. | 150/167 |
| D423,432 S * | 4/2000 | DeCaluwe et al. | .......... | D12/182 |
| 6,120,083 A * | 9/2000 | Gunther | ....................... | 296/78.1 |
| 6,231,104 B1 * | 5/2001 | Roethel | ........................ | 296/78.1 |
| 6,923,489 B2 * | 8/2005 | Keys | ............................. | 296/77.1 |
| 6,951,361 B2 * | 10/2005 | Keys | ............................. | 296/77.1 |
| 7,828,360 B2 * | 11/2010 | Salisbury | ..................... | 296/78.1 |
| D649,497 S * | 11/2011 | Adams | .......................... | D12/182 |
| 8,136,865 B1 * | 3/2012 | Beck | ......................... | 296/136.08 |
| 2005/0200153 A1* | 9/2005 | Khan | ............................ | 296/78.1 |
| 2006/0145511 A1* | 7/2006 | Traher | ...................... | 296/136.07 |
| 2006/0284444 A1* | 12/2006 | Wall, II | .................... | 296/136.07 |
| 2010/0096877 A1* | 4/2010 | Vinson | .......................... | 296/78.1 |

* cited by examiner

*Primary Examiner* — John Walters
*Assistant Examiner* — Brian Swenson
(74) *Attorney, Agent, or Firm* — Panitch Schwarze Belisario & Nadel LLP

(57) ABSTRACT

A motorcycle fairing cover is made of a stretch-recovery fabric having a front face and an opposite face and defining an opening. The stretch-recovery fabric is stretched to place it into position over the motorcycle fairing. One or more non-slip patches or tapes are appended to or formed on the opposite face adapted to contact the motorcycle fairing when the cover is installed. A motorcycle headlight is exposed through the opening. Optional fasteners may be included for joining or tying the motorcycle fairing mask to a motorcycle component.

13 Claims, 11 Drawing Sheets

PROTECTIVE COVER FOR MOTORCYCLE FAIRING

CROSS-REFERENCE TO RELATED APPLICATIONS

This application is a regular utility application claiming priority under 35 USC §119(e) to U.S. Provisional Patent Application Ser. No. 61/876,249, filed Sep. 11, 2013, the contents of which are incorporated by reference herein.

TECHNICAL FIELD

A fairing cover or mask is a removable protective cover that is installed over a front fairing of a touring style motorcycle, such as but not limited to a "batwing" fairing of a Harley-Davidson™ motorcycle, to protect the paint finish from road grime, bugs, bird droppings, tree sap, etc. Consumers and industry also refer to this type of product as a "bra".

BACKGROUND OF THE INVENTION

A motorcycle fairing is a shell placed over the frame of some motorcycles, especially racing motorcycles, sport bikes and touring style motorcycles, with the primary purpose to reduce air drag and improve fuel economy. The secondary functions are to protect the rider from airborne hazards and to protect the engine components in the case of an accident. A motorcycle windshield may be an integral part of the front fairing.

Performance motorcycles are a sizeable investment. Protection and care of this investment is a key concern. The exterior paint of these motorcycles is subject to wear and damage even under normal operating conditions. Particularly the front fairing can be damaged by contact with road debris or insects or other airborne hazards.

Current protective mask solutions are constructed from vinyl, leather or an applied protective film. These solutions can be large, bulky, difficult to install, hard to remove, poor fitting (which can damage the vehicle or the fairing), can require permanent alteration to the vehicle from drilling or cutting, and can be expensive. Masks or covers to protect motorcycle fairings that are more cost effective and easier to install than the current products continue to be sought.

BRIEF SUMMARY OF THE INVENTION

A motorcycle fairing cover is made of a stretch-recovery fabric having a front face and an opposite face and defining an opening. The stretch-recovery fabric is stretched to place it into position over the motorcycle fairing. One or more non-slip patches or tapes are appended to or formed on the opposite face of the fairing cover and are adapted to contact the motorcycle fairing when the cover is installed. For batwing fairings, a motorcycle headlight is exposed through the opening. Optional fasteners may be included for joining or tying the motorcycle fairing mask to a motorcycle component.

In one embodiment, the motorcycle fairing cover has an outer peripheral shape of an oval. In an alternative embodiment, the motorcycle fairing cover has an outer peripheral shape of a batwing, with a generally straight top edge, a generally straight bottom edge and angled side edges that terminate into angled corners or points forming the "wings". Both the oval and this "batwing" shape fit onto the motorcycle fairing of a Harley-Davidson™ motorcycle. The cover or mask may have alternative peripheral shapes, such as rectangular, triangular or ovoid. The cover or mask may be installed over fairings of other style motorcycles.

DESCRIPTION OF THE DRAWINGS

The foregoing summary, as well as the following detailed description of the invention, will be better understood when read in conjunction with the appended drawings. For the purpose of illustrating the invention, the drawings show presently preferred embodiments. However, the invention is not limited to the precise arrangements and instrumentalities shown.

DETAILED DESCRIPTION OF THE INVENTION

Figure 1:
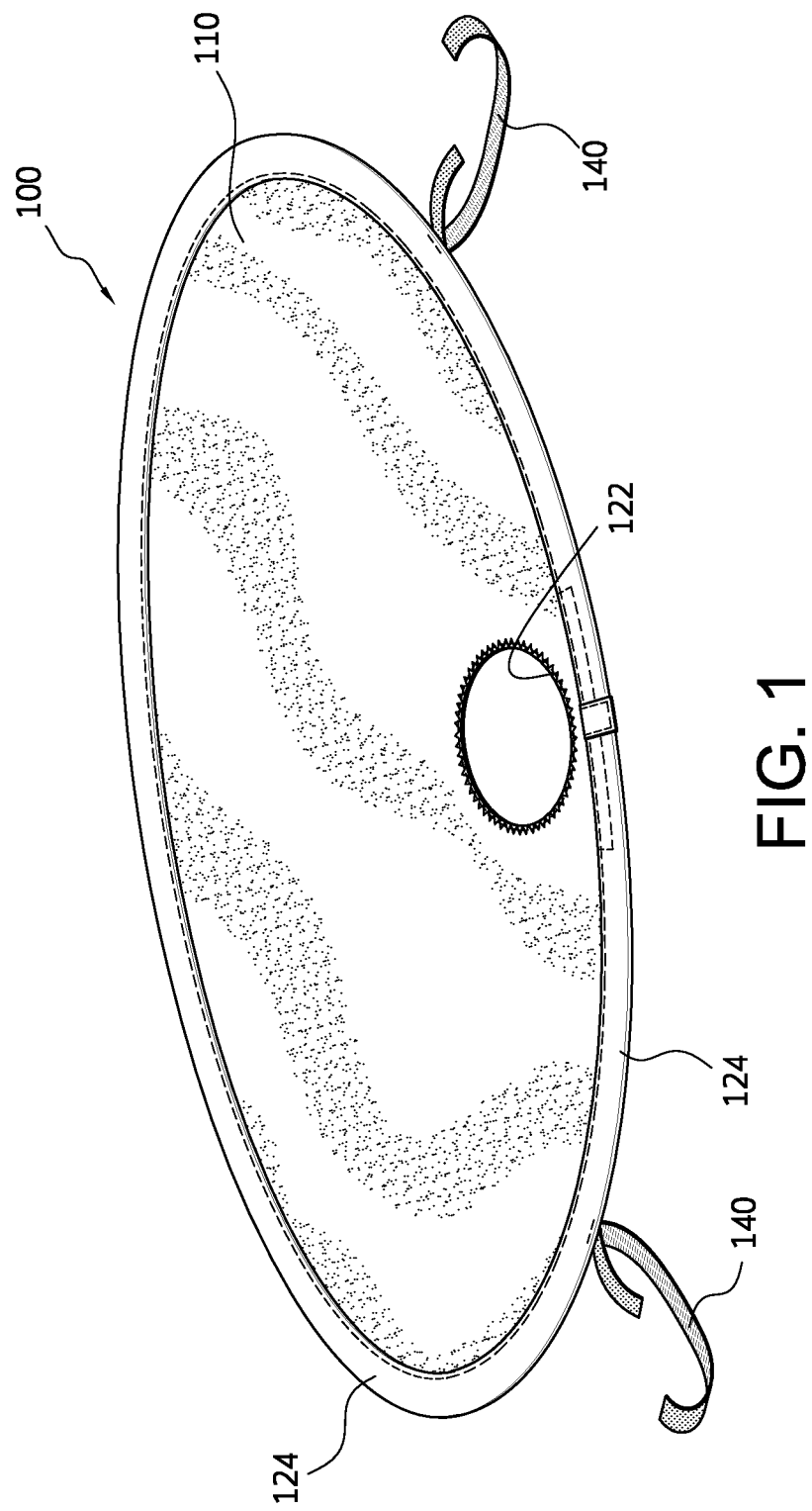
FIG. 1 is a right front perspective view of a motorcycle fairing cover or mask that is not yet installed over a motorcycle fairing.
Figure 2:
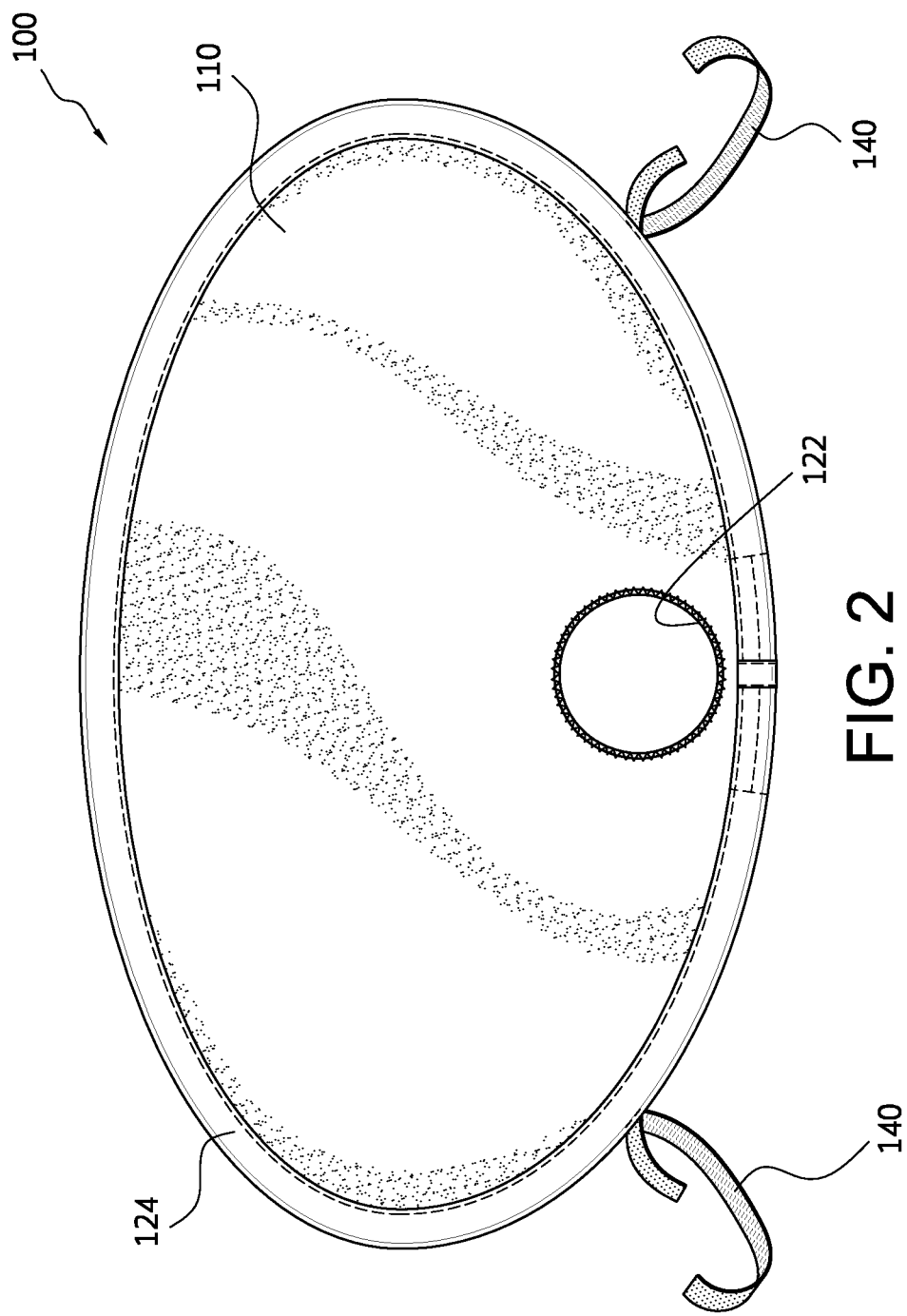
FIG. 2 is front plan view of the motorcycle fairing cover or mask of FIG. 1.
Figure 3:
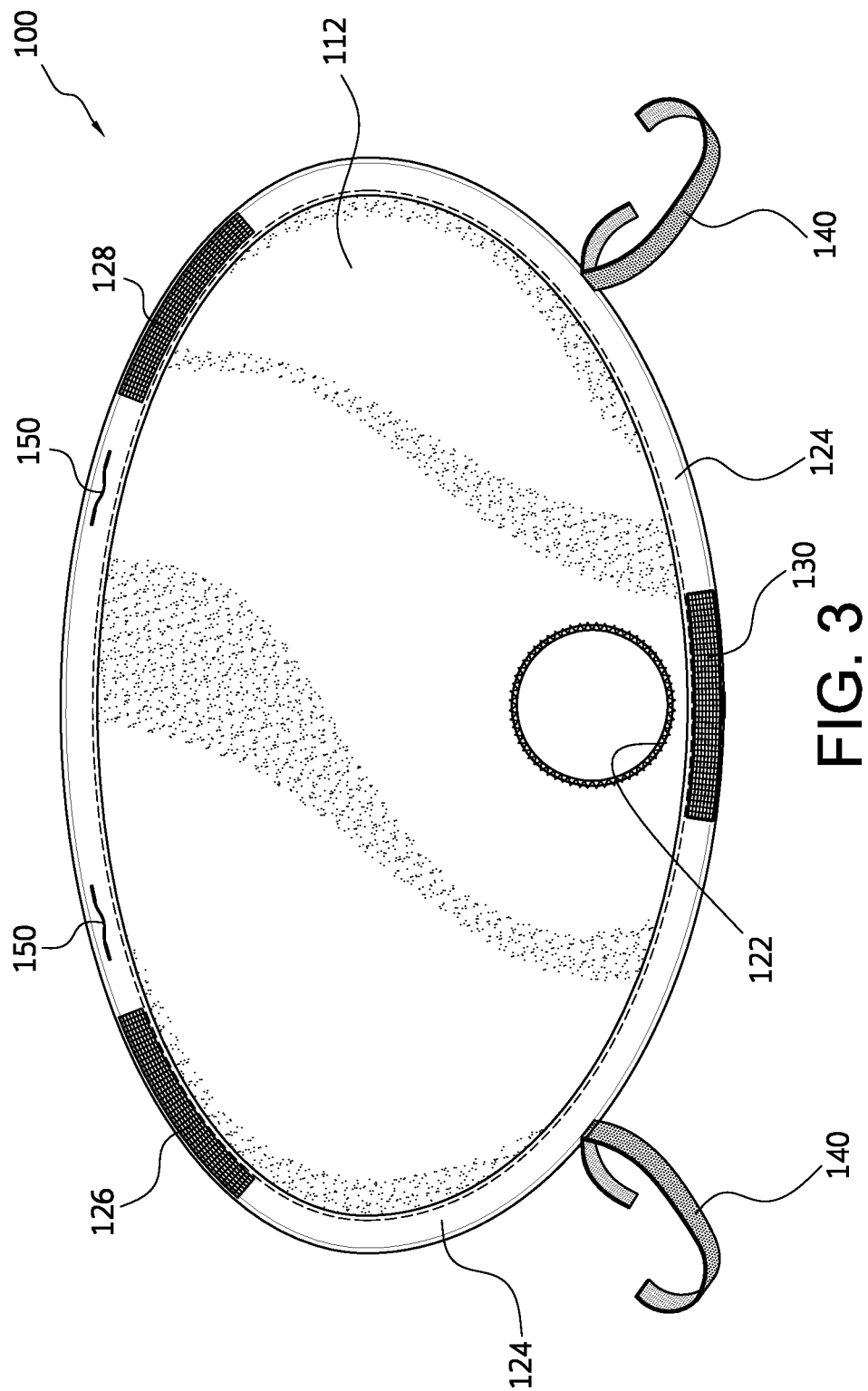
FIG. 3 is a rear plan view of the motorcycle fairing cover or mask of FIG. 1.

Referring first to FIGS. 1-3, the fairing mask 100 has a material base of fabric that has a multi-directional stretch and a "stretch and recovery" characteristic known as "rebound" that can expand around the fairing and then provide tension via the recovery property to secure installation. The raw edges of the base material are finished by hemming with non-roll elastic hem tape. Alternatively, the raw edges of the base material may be finished with biased cotton tape, surrounding, inserted polybraid elastic cording of various diameters and sewn applications of multiple sections of non-slid, non-skid material and attached draw-string fabric cording.

In one embodiment, the fabric is an 80/20 blend of nylon and spandex. However the fabric can consist of different fiber blends and percentages to achieve the required "rebound".

The mask 100 is produced from a patterned shape that is dimensionally correct to fit the contours of the motorcycle fairing on which it will be placed. The dimensional correctness is defined/dictated particularly by the effort required to install the mask balanced against the "holding power" of the mask on to the fairing. In the embodiment shown in FIGS. 1-3, the mask 100 is designed to cover a "batwing" front fairing of a Harley-Davidson™ motorcycle.

The mask 100 shown in FIGS. 1-3 has a front face 110 and a rear face 112 opposite to the front face 110. The mask is formed with a generally oval outer circumference and has a circular or oval opening 122 formed through a center portion of the mask. Alternative peripheral shapes may be selected to cover motorcycle fairings of alternative shapes. For example, the motorcycle fairing cover may have an ovoid, triangular, rectangular, diamond or irregular peripheral shape. As shown in FIGS. 1-3, the circular opening 122 is in a location that is offset from the center of the oval and is spaced apart from a bottom edge of the mask. The circular opening 122 serves as the headlamp opening through the mask 100 when the mask is installed onto a "batwing" fairing of a motorcycle. The circular opening 122 may be reinforced at its edge by stitching (as shown in FIGS. 1-3) or by bias tape or non-roll elastic hem tape.

The outer or circumferential edge of the mask 100 is finished with a non-roll elastic hem tape 124 sewn or otherwise joined to the fabric at or near the circumferential edge. Alternatively, the circumferential edge of the mask maybe finished with biased cotton hem tape, and an inserted polybraid elastic cording or other length of elastic may be inserted therein.

Strips of anti-skid/non-slip material 126, 128, 130 are applied to or sewn onto the rear face 112 or inside surface of the mask 100, either at or near the outer or circumferential edge. As shown in FIG. 3, the strips 126, 128 and 130 are applied to the non-roll elastic hem tape 124. Optionally, all or substantially all of the surface of the non-roll elastic hem tape 124 on the rear surface side of the mask 100 may be covered with anti-skid/non-slip material. The strips 126, 128 and 130 are placed at strategic locations in the embodiment shown in FIG. 3. Strips 126 and 128 are positioned at side edges of the mask 100 to better maintain these sides of the mask 100 in frictional engagement with curved outer or side surfaces of the motorcycle fairing 26 during and after installation of the mask 100. Strip 130 is positioned at an edge of the mask 100 that is nearest to the circular opening 122. Strip 130 enhances frictional engagement between the edge of the mask 100 and the surface of the motorcycle fairing 26 at or near the headlamp 23 of the motorcycle when the mask 100 is installed.

Hook and loop straps 140 or alternatively drawstrings are applied to or sewn onto portions of the outer or circumferential edge of the mask 100 or to the hem tape 124 at the bottom left and right of center of the mask 100. The straps or drawstrings when utilized ensure a complete tight fit at final installation, and add a level of safety to prevent the fairing cover or mask from coming off unexpectedly due to a material or installation failure.

Figure 7:
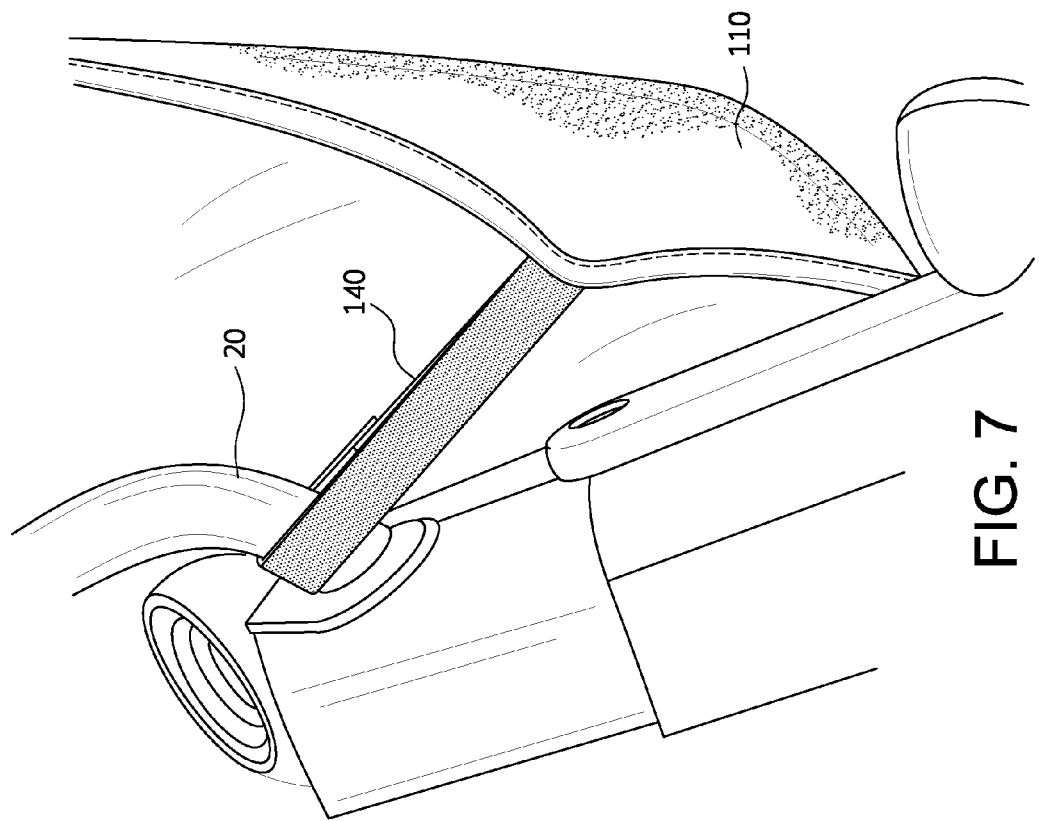
FIG. 7 is an enlarged perspective view of the straps associated with the fairing cover or mask of FIG. 1 that are attached to the motorcycle handle bar.
Figure 8:
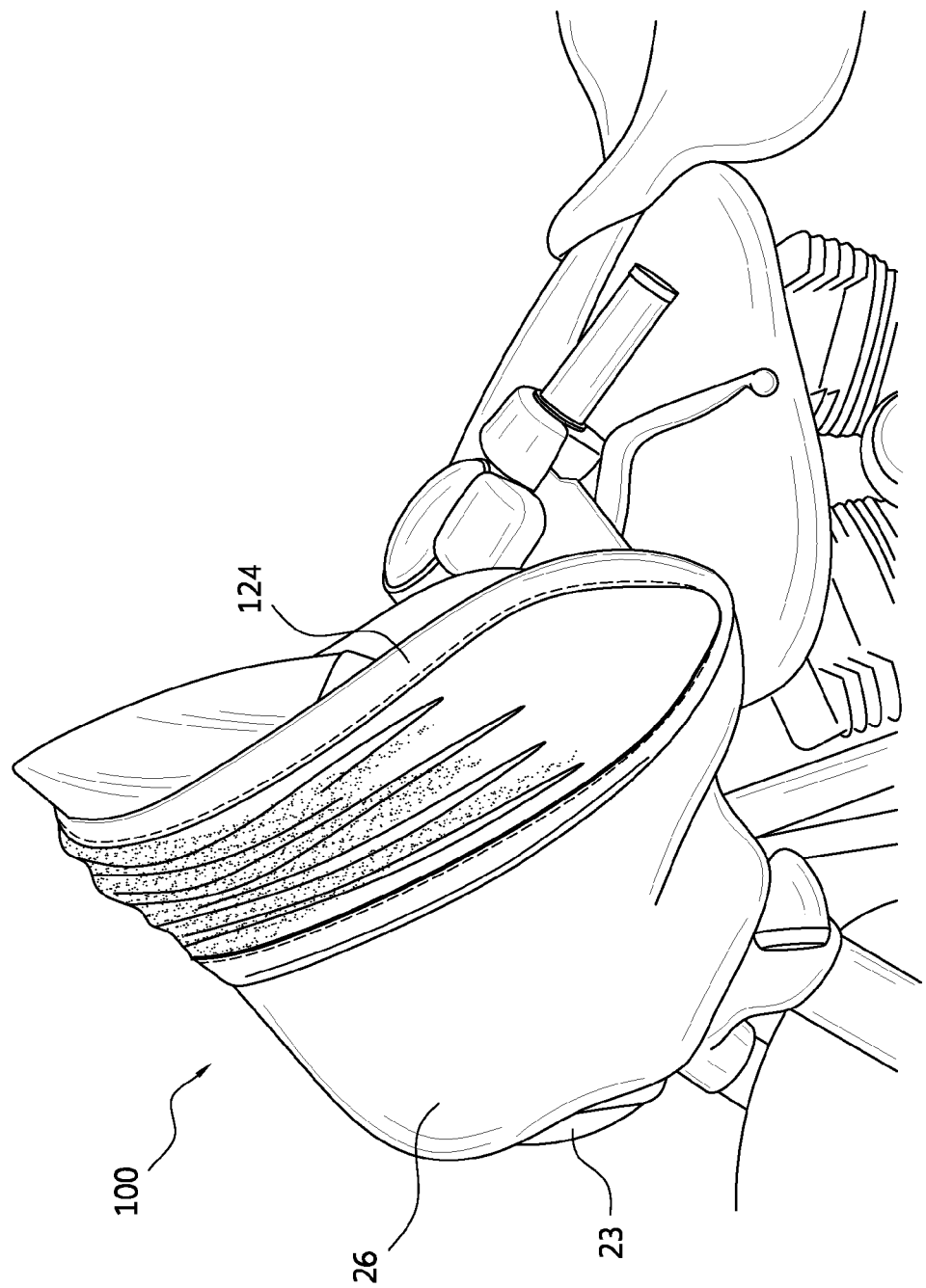
FIG. 8 is a right side perspective view of a portion of a motorcycle with the fairing cover or mask of FIG. 1 contacting a top portion of the motorcycle fairing in a first step of installing the fairing cover or mask onto the motorcycle fairing.

Referring next to FIGS. 4-10, installation of the mask 100 onto a "batwing" fairing 26 of a motorcycle is illustrated. As shown in FIG. 8, the mask 100 or cover is held at its opposite ends and stretched and moved into place fitting over the sides or ends of the motorcycle fairing 26. The strips 126, 128 of the non-slip material help prevent the mask 100 from "rebounding" until the installation is completed.

Next, the mask 100 or cover is positioned over the top and bottom of the motorcycle fairing 26 by pulling down the mask 100 at the bottom-center until the opening 122 in the mask is centered over the headlamp 23 of the motorcycle. See FIGS. 5, 9 and 10. At this stage, the opposite face 112 of the mask 100 contacts the motorcycle fairing 26 surface, and the strips 126, 128 and 130 of anti-skid/non-slip material hold the mask 100 in place on the fairing surface by frictional engagement. A rider may choose to use the installed mask 100 without further connections to the motorcycle structure beyond this frictional engagement.

Figure 4:
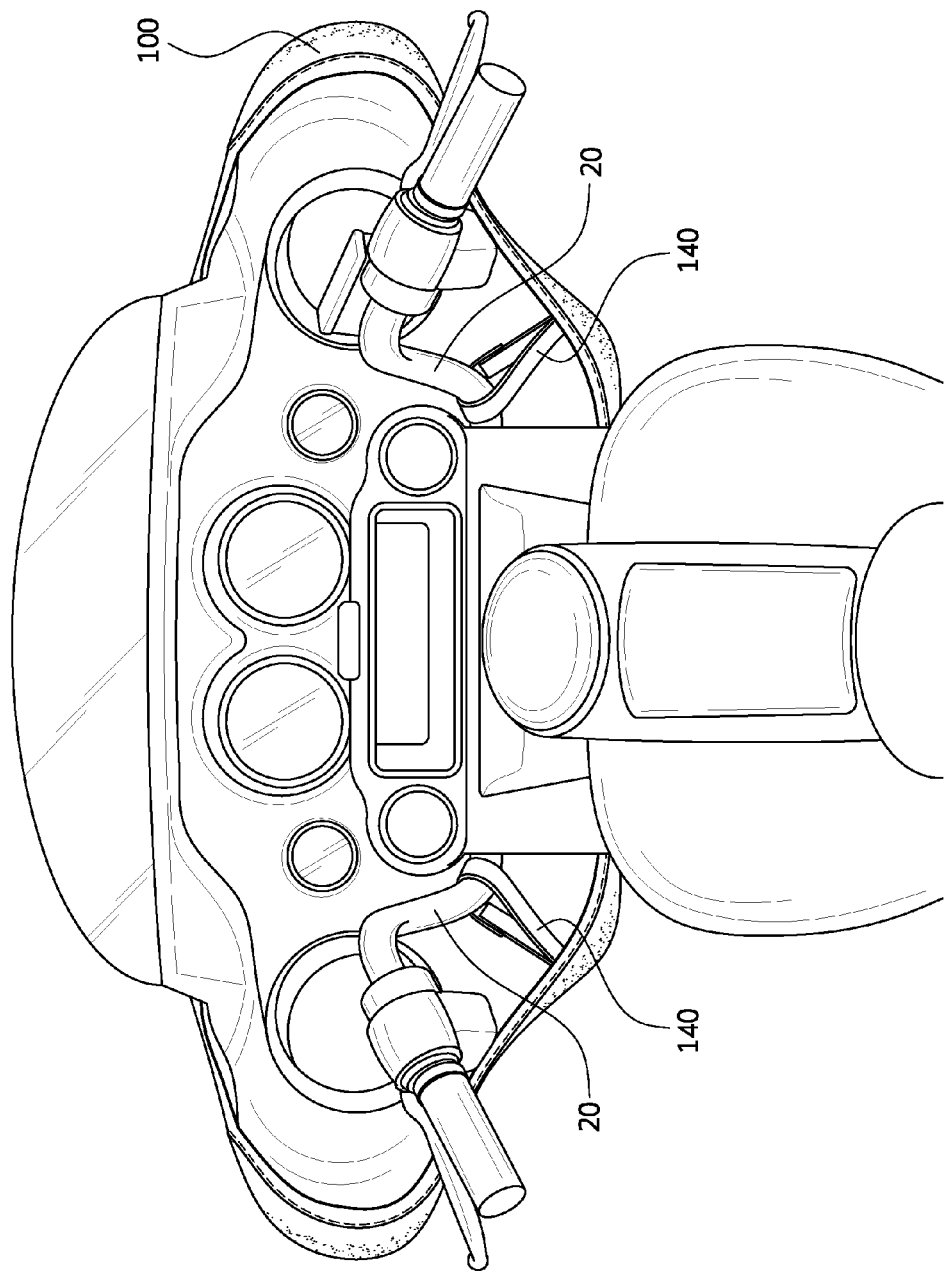
FIG. 4 is a rear perspective view of a portion of a motorcycle with the fairing cover or mask of FIG. 1 attached to the motorcycle fairing.
Figure 5:
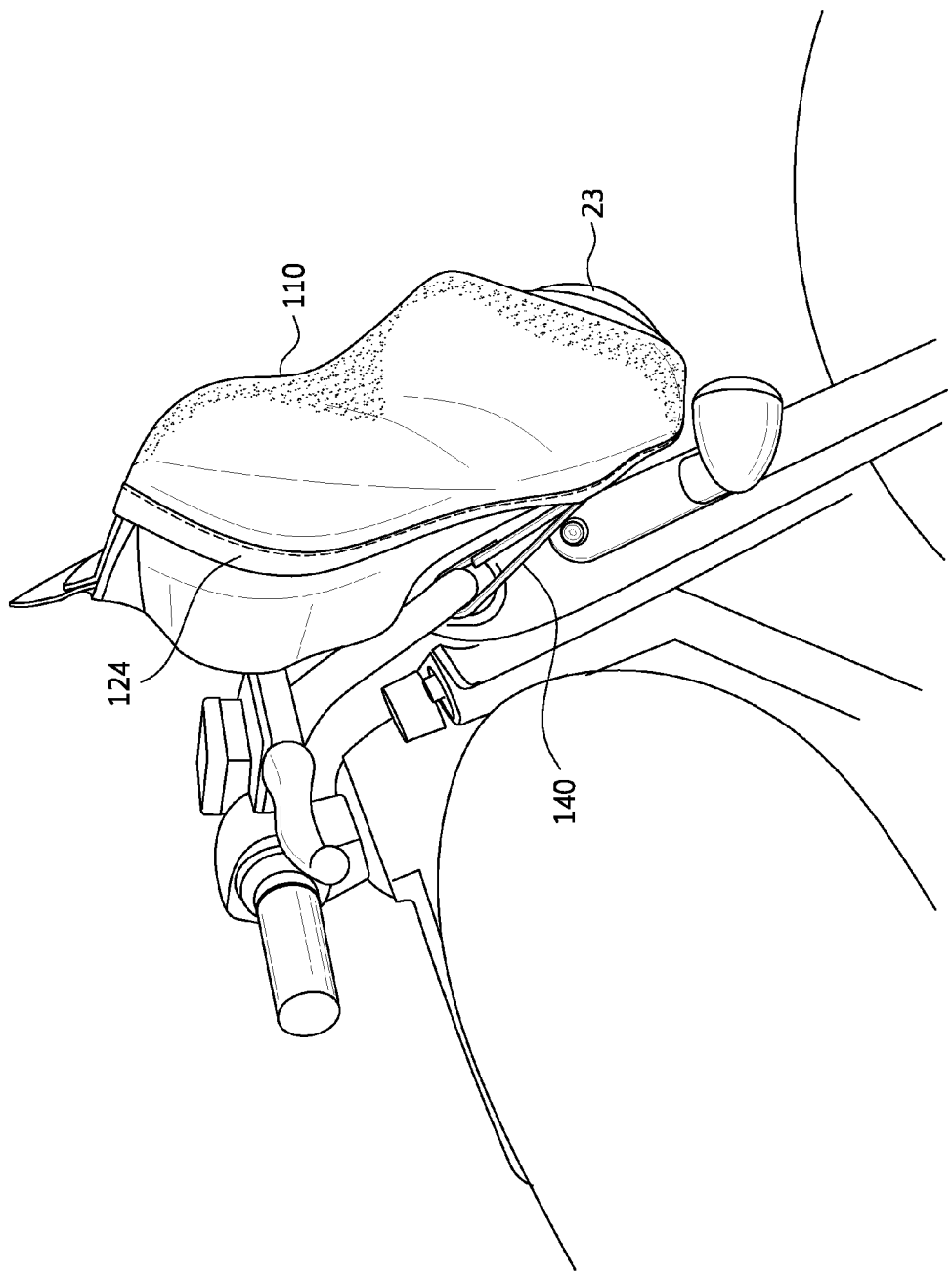
FIG. 5 is a left side perspective view of a portion of the motorcycle with the fairing cover or mask of FIG. 1 attached to the motorcycle fairing with straps joined to the handle bar.
Figure 6:
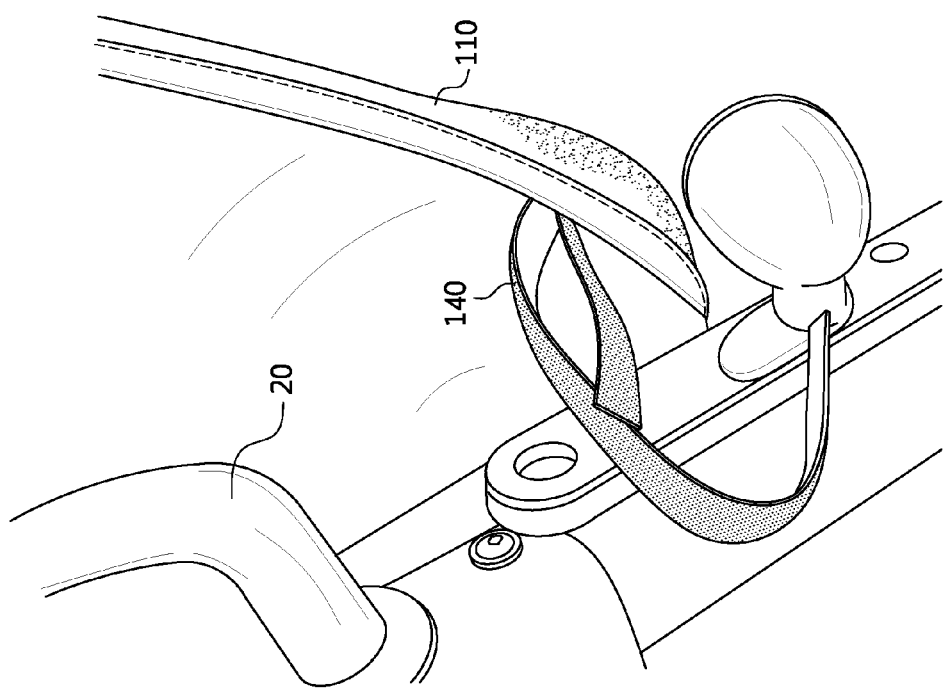
FIG. 6 is an enlarged perspective view of straps associated with the fairing cover or mask of FIG. 1 before attaching the straps to the motorcycle handle bar.

Referring to FIGS. 4, 6 and 7, preferably, the hook and loop straps 140 (or alternatively drawstrings) are joined together or tied to secure the mask 100 to the handlebars 20 (one on each side).

Optionally, loops 150 at a top edge of the fairing cover or mask 100 are attached to thumb screws 27 installed on the motorcycle fairing 26. See FIGS. 9 and 10.

Figure 9:
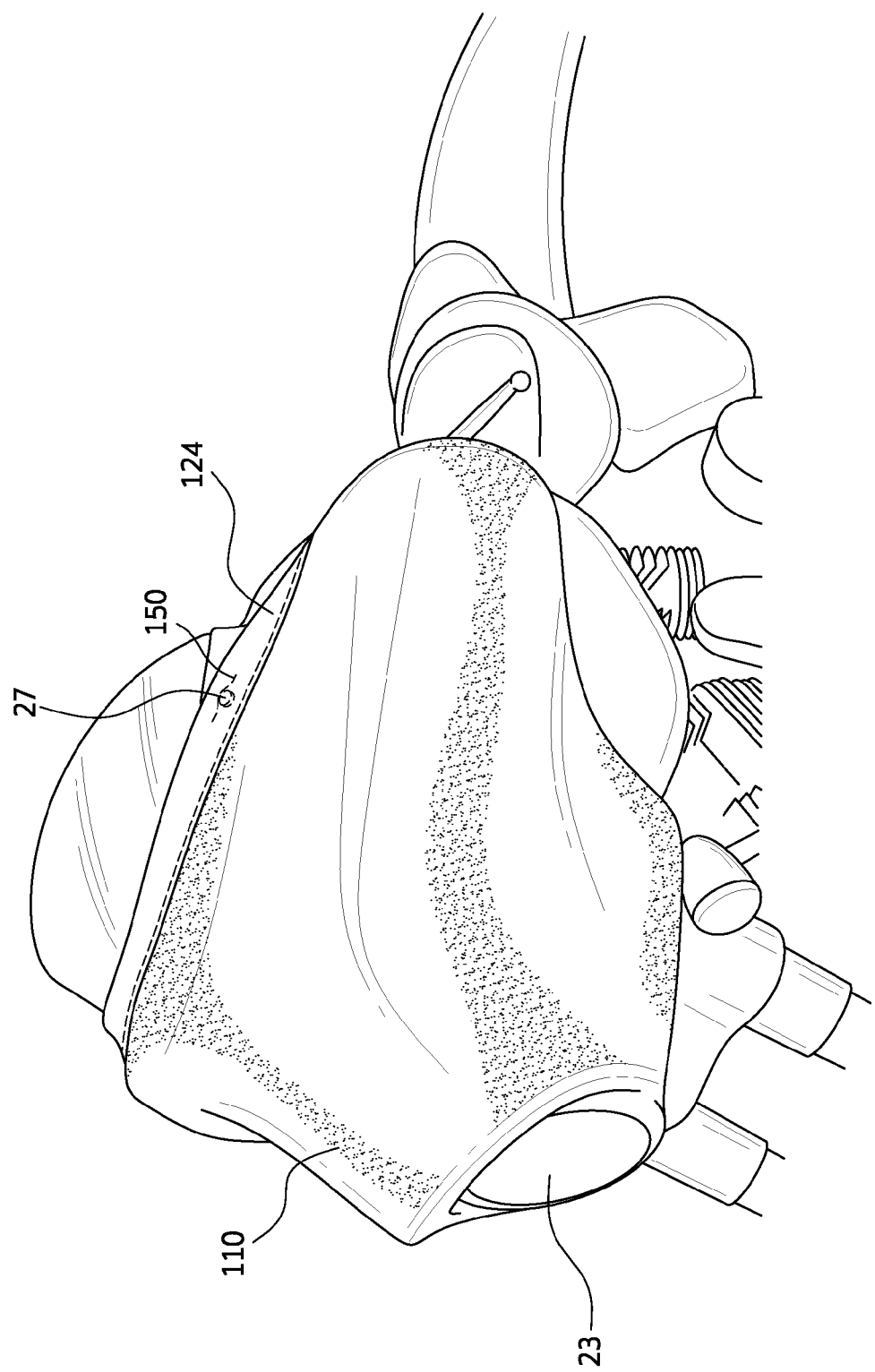
FIG. 9 is a right side perspective view of a portion of the motorcycle with the fairing cover or mask of FIG. 1 installed onto the motorcycle fairing.
Figure 10:
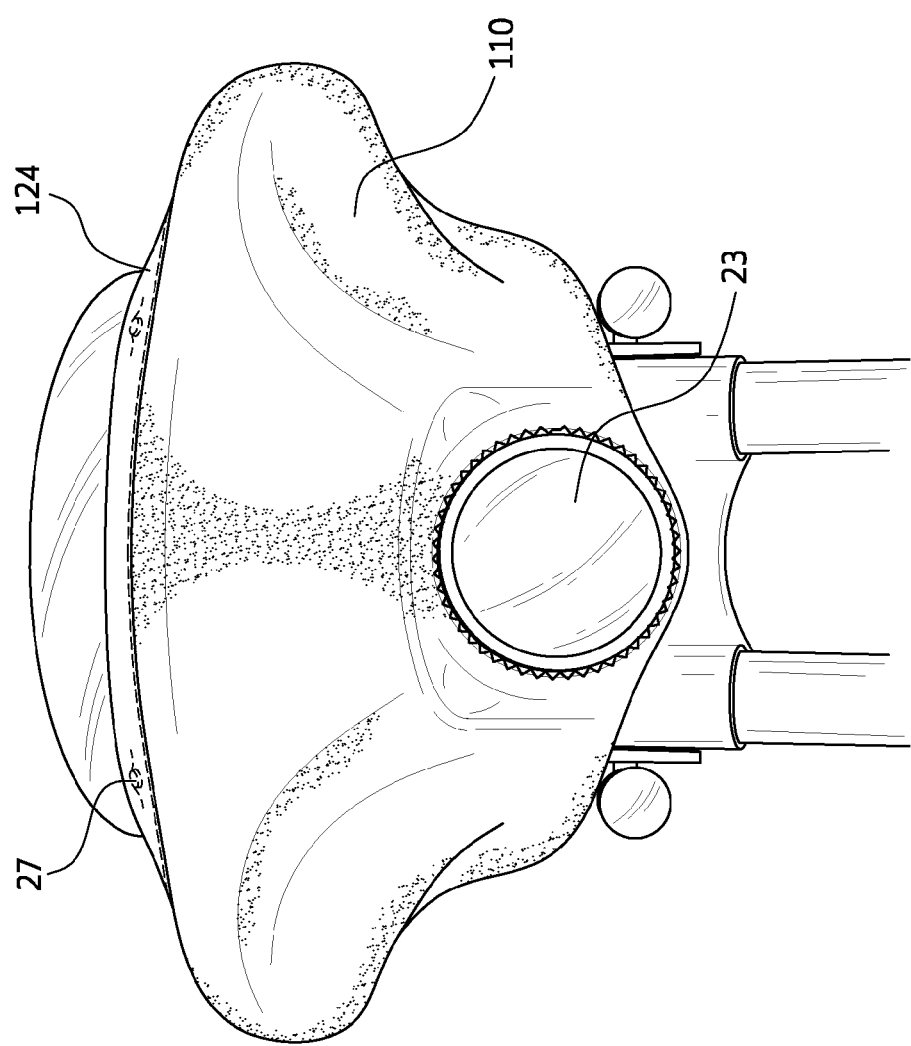
FIG. 10 is a front perspective view of a portion of the motorcycle with the fairing cover or mask of FIG. 1 installed onto the motorcycle fairing.

As shown in FIGS. 4, 9 and 10, once installed, the mask 100 completely or substantially completely covers the outer surface of the fairing 26 and laps over the inner fairing several inches at the ends and at the bottom.

To remove the mask 100, the process is reversed. First, the hook and loop straps 140 are unmated or separated, or the drawstrings are untied, from the handlebars. If used, the loops 150 are disengaged from the thumb screws 27. Then, grasping the fairing cover or mask 100 at the end with both hands, it may be stretched until it releases from the fairing 26.

Figure 11:
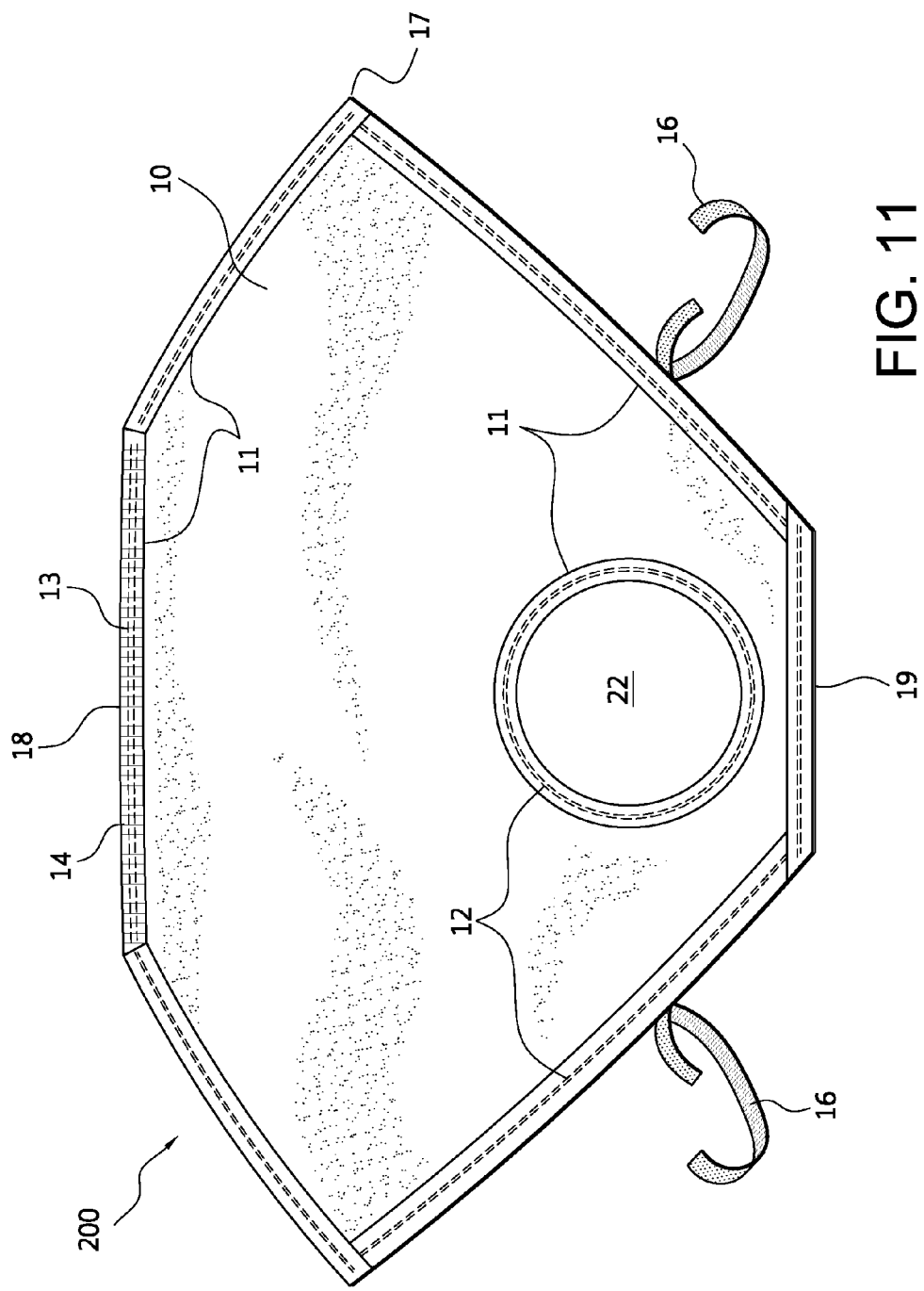
FIG. 11 is a front plan view of an alternative embodiment of a motorcycle fairing cover or mask that is not yet installed over a motorcycle fairing.
Figure 12:
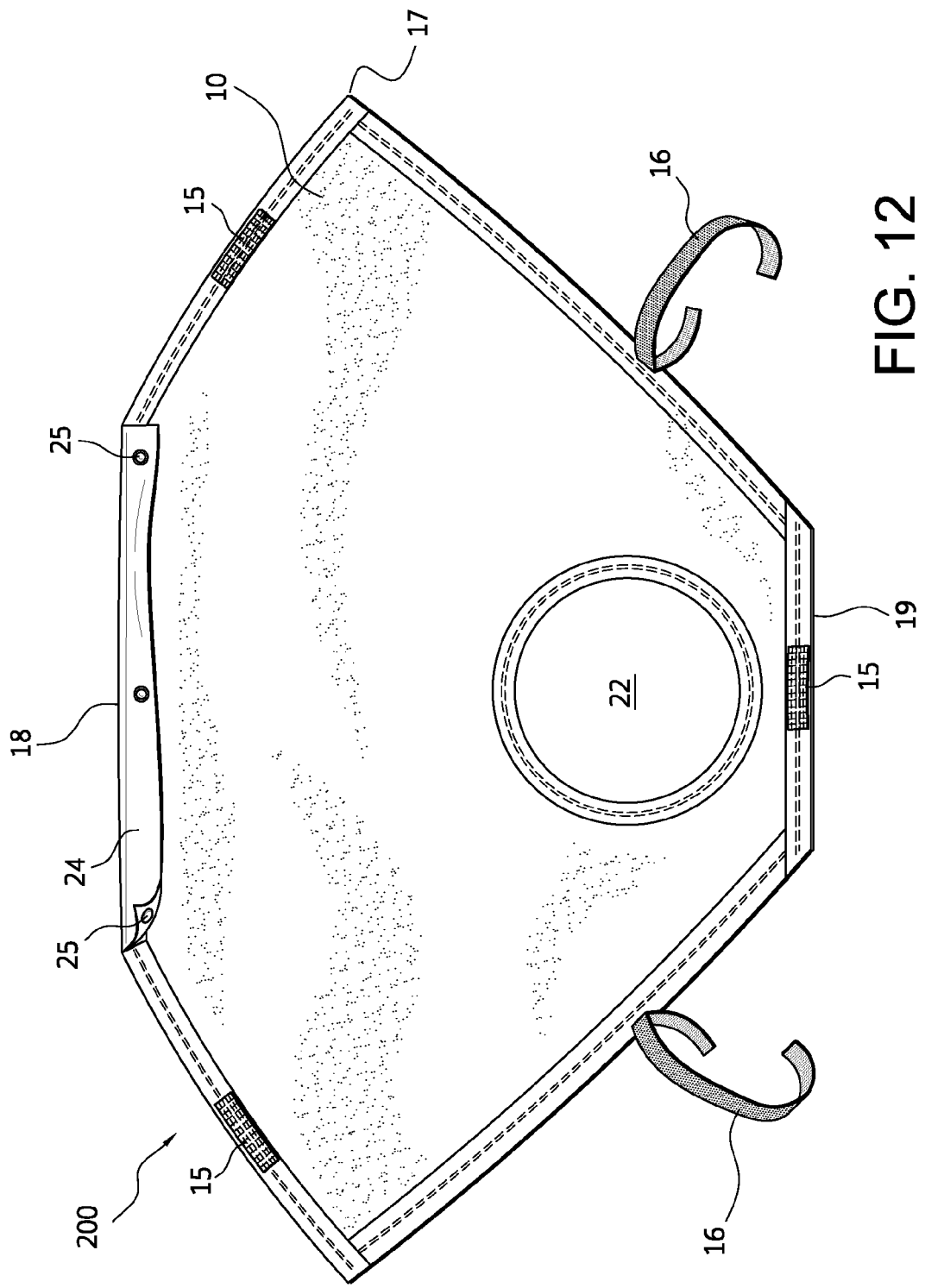
FIG. 12 is a rear plan view of the motorcycle fairing cover or mask of FIG. 11.

An alternative embodiment of a motorcycle fairing cover or mask 200 is shown in FIGS. 11 and 12. This alternative embodiment 200 of the Removable Fairing Mask further is shown in photographs comprising the figures of the provisional application, incorporated herein by reference. This alternative embodiment 200 also is designed to cover a "batwing" front fairing of a Harley-Davidson™ motorcycle. The patterned shape of the mask has a generally straight upper or top edge 18 and a generally straight lower edge or bottom 19. The side edges angle away from the top edge 18 at a first angle, and angle away from the bottom edge 19 at a second angle, and meet at points 17 at the sides thus forming a "batwing" periphery. A generally circular or oval opening 22 is formed through a center portion of the mask.

Producing the mask involves the transfer of the patterned shape to the fabric and then finishing the raw edges. In the embodiment shown in FIGS. 11 and 12, the outer edges of the mask 200 and edges of the approximately 6 to 7 inch diameter circular opening 22 in the fabric are finished by sewing a ½ inch double fold cotton bias tape 11 to the top edge 18, side edges, and bottom edge 19 of the fabric.

In the embodiment shown in FIGS. 11 and 12, optionally, a ⅛ inch polybraid elastic cord 12 is inserted into the bias tape 11 at the top edge 18, bottom edge 19 and side edges and sewn at each end. (This cording is sized to provide a prescribed tension on this part of the mask when installed on the fairing). In addition, optionally a ⅛ inch polycord 12 is inserted into the bias tape that edges the 6 to 7 inch hole 22.

The top 18 is hemmed using a ⅜ inch polybraid elastic 13.

An overlay 14 of ¾ inch non-roll elastic is then sewn in place.

Strips of anti-skid/non-slip material 15 are sewn on the inside surface of the mask 100, preferably at or near each upper corner and beneath the hole 22, which serves as the headlamp opening through the mask 100. See FIG. 12.

Hook and loop straps 16 or alternatively drawstrings are sewn at the bottom left and right of center (the straps or drawstrings when utilized ensure a complete tight fit at final installation, and add a level of safety to prevent the cover from coming off unexpectedly due to a material or installation failure). See FIG. 12.

Optionally, a flap 24 may be formed at the top edge 18. Snaps 25 may be appended to the flap 24 for securing the top edge 18 and flap 24 to mounting structure on the motorcycle fairing 26. Such mounting structure may comprise thumb screws 27 or other fasteners installed at a top edge or surface of the motorcycle fairing 26 that mate with snaps 25 appended to the flap 24.

Product Features and Components:

Constructed from a stretchable Nylon and Lycra fabric blend.

Edged with bias tape and elastic binding.

Utilization of stretch fabric for fitted, "form & resistance" installation relies on the exact sizing of the cover and the "rebound" capability of the material to obtain a secure fit to the fairing.

Non-skid material strips provides resistance to aid in secure installation. Hook and loop straps provide finished installation, and serve as Safety/Redundancy Straps or ties.

Nylon and Lycra fabric blend.

Optional thumb screws (¼-20×½").

Optional snap fasteners (¼-20×½").

5½"×9" storage bag.

Product and Packaging Technical Specifications:

Fairing Cover or Mask

Stitched/sewn with #69 synthetic, UV-resistant thread.

Made from 8 oz. weight Spandex (80/20 blend), 4-Way Stretch, Matte finish fabric. Base pattern dimension is 34 inch×20 inch with approximately 6 to 7 inch circular opening (through which motorcycle headlight may be exposed). Alternative stretch fabrics and other fabric weights may be used.

Ends, bottom and hole are edged with ½" extra-wide, double-fold, black, cotton biased tape or similar technique to create a finished edge.

⅛" poly-braid elastic tension cord is inserted inside ends and bottom edging.

Circular opening is reinforced with ⅛ inch hard-foam cording inserted into edging.

Top hemmed spandex with ⅜ inch poly-braid elastic insert, ¾ inch nonroll elastic overlay and two anti-skid patches at each corner. Anti-skid patches are formed of sections of Rhino Grip Traction Rug non-slip holding strips that are also known as Robert's Anti-Slip Rubber Strip.

Two 12 inch hook and loop fabric "one-wrap" straps sewn to bottom edge of mask, along with product label. Drawstrings are an alternative to hook and loop fabric straps.

Optional loops or snap fasteners at top edge or on flap at top edge of motorcycle fairing cover to engage thumb screws for additional point of attachment onto motorcycle fairing.

Product Benefits:

Stretch fabric application allows for tight, contoured fit over the fairing with great flexibility to accommodate accessories that may have been added to the fairing (i.e., air deflectors, etc.).

Durable, breathable fabric protects painted surface from rocks, bugs and other related road debris, prevents moisture build up or chaffing without damaging clear-coat paint finish.

Stretch fabric, elastic banding and edging, non-skid strips, and hook and loop securing straps (or alternatively other ties) allow quick, easy installation based on the principles of friction (resistance installation). No hardware is required. Neither the motorcycle nor its fairing are altered.

Use of stretch fabric in the design allows for easy cleaning, maintenance and compact storage when not in use.

How the Product Works:

The NoviStretch™ Cover or Fairing Mask is installed by "stretch-fitting" the mask over the fairing surface. The built-in contours of the mask and the anti-skid patches anchor the cover at three points (each of the ends and the bottom under the headlamp).

The installed Fairing Mask protects from environmental elements and conditions, such as road debris and bugs, and the tight fit to prevents the cover from coming loose during operation of the motorcycle. Yet the cover is easily removed for cleaning and or storage when not in use.

Hook and Loop redundancy/safety straps or drawstrings mechanically secure the product to the motorcycle. These have been integrated into the design to complete secure, tight installation and ensure the safety of the product use in the event of a material failure or fabrication defect.

Optional snap fasteners mechanically secure the top edge of the product to the motorcycle.

Advantages of the Product:

The NoviStretch™ Fairing mask is a stretch-fabric protective cover that can be easily installed and removed generally without any hardware, tools or alteration to the motorcycle in a fraction of the time of current solutions. The stretch fabric cover does a better job of protecting the part without risk of the cover itself doing damage to the part due to moisture buildup or chaffing.

The design of the cover is more attractive because the material fits perfectly to the contours of the fairing. This type of fit is just not possible with vinyl or leather which requires many seams to approximate the correct shape. Also because of the flexible nature of a fabric versus the more rigid structure of vinyl/leather, the cover is more cost-effective to produce, inventory and ship.

Covers made from stretch-fabric technology help keep exposed motorcycles clean and protected.

Operation

The manner of using the cover to protect the motorcycle fairing is best described as follows:

Holding the cover at the ends with each hand, the cover is stretched and moved into place fitting over the ends of the fairing.

The non-slip material helps prevent the mask from "rebounding" until the installation is completed.

The mask can now be positioned by pulling down at the bottom-center until the 6 to 7 inch hole in the mask is centered over the headlamp of the motorcycle.

The hook and loop straps or drawstrings can now be tied to secure the mask to the handlebars (one on each side).

Optionally, connect snap fasteners at top edge of fairing cover to thumb screws installed on motorcycle fairing.

This completes the installation.

At this point the mask completely covers the outer fairing and laps over the inner fairing several inches at the ends and at the bottom.

To remove the mask, the process is reversed. Starting with unmating or separating the hook and loop straps, or untying the drawstrings, then grasping the cover at the end with both hands and stretching it until the cover releases from the fairing.

ALTERNATIVE EMBODIMENTS & RAMIFICATIONS

Below are a variety of alternatives and substitutes for components of the stretch-to-fit fairing cover:

One of the core attributes of the Stretch-to-fit Protective Covering is the friction or resistance nature of the installation. This friction or resistance installation is comprised of three core components; the stretch properties of the base fabric, the stretch properties of the elastic braiding and binding, and the non-skid properties of the non-slip tape. Each component contributes in some way to the matrixed final result, and is ultimately substitutable in some regard and there are various possibilities with regard to how the "stretch and recovery" of the removable fairing mask is achieved.

The choice of textile material (i.e., fabric) used in the fabrication of the product is one key variant. The selected fabric may be constructed of several different fibers (i.e., nylon, polyester, spandex, elastomers, etc.); the percentage blend of those fibers in the fabric is also a variant. The choice of which fabric determines how well the product will function over time. The difference can be measured in the expected service life of the product (i.e., months or years).

The cloth-biased tape functions to provide a pocketed finished edge for insertion of the polybraid elastic. This could be replaced with alternative hem tapes, a traditional hemmed edge, etc.

As well, the polybraid elastic cording which provides an element of recovery and elastic restriction at the edges of the mask can be substituted for different diameters of cording.

The biased tape and polybraid cord configuration could be replaced with a single non-roll or roll elastic material, or stretch-fabric hem material.

The non-slip tape that provides resistance to prevent the mask from slipping and coming free of the fairing could be replaced with alternate materials, such as various shelf lining material, rubber or polymer sheeting, applied adhesive spray.

The "one-wrap" hook and loop straps used as installation adjustment and safety straps could be replaced by drawstrings or cording of other various construction, separate hook & loop cloth, etc.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

COMPONENTS 10 base fabric
11 bias tape
12 elastic cord
13 /3;8 inch elastic
14 /3;4 inch non-roll elastic
15 non-slip tape
16 hook and loop "one-wrap" straps
17 end
18 top
19 bottom
20 handlebar
21 /1;8 inch poly cord
22 hole or opening
23 headlamp
24 flap
25 snaps
26 fairing
27 thumb screws on fairing
100 mask or cover (first embodiment)
110 front face
112 rear face
122 hole
124 non-roll elastic or stretch-fabric hem
126 strip of non-slip tape
128 strip of non-slip tape
130 strip of non-slip tape
140 hook and loop "one-wrap" straps
150 loops to engage fasteners on motorcycle fairing
200 mask or cover (second embodiment)

We claim:

1. A motorcycle fairing cover, comprising:
a stretch-recovery fabric having a front face and an opposite face and having an outer periphery of a first length and width in an unstretched condition and a second length and width greater than the first length and width in a stretched condition, said fabric further defining an opening; and
at least one anti-skid patch appended to or formed on the opposite face;
wherein the stretch-recovery fabric when in its stretched condition is adapted for covering an outer surface of the motorcycle fairing with at least a portion of the opposite face in contact with the outer surface of said fairing, and with the anti-skid patch in direct contact with the outer surface of said fairing to establish frictional engagement between the fairing cover and the outer surface of the motorcycle fairing, and with a motorcycle headlight exposed through said opening.

2. The motorcycle fairing cover of claim 1, further comprising at least one second anti-skid patch appended to or formed at a different location on the opposite face of the stretch-recovery fabric to contact the outer surface of said fairing to establish frictional engagement between the fairing cover and the outer surface of the motorcycle fairing.

3. The motorcycle fairing cover of claim 2, wherein the motorcycle fairing cover defines a top edge, a bottom edge and left corner portion and a right corner portion, and wherein the at least one anti-skid patch is appended or formed on the opposite face at at least one corner portion, and the at least one second anti-skid patch is appended to or formed on the opposite face at a different corner position.

4. The motorcycle fairing cover of claim 3, wherein at least one third anti-skid patch is appended to or formed on the opposite face at, adjacent to or near the opening.

5. The motorcycle fairing cover of claim 1, further comprising at least one fastener adapted for joining or tying the motorcycle fairing mask to a motorcycle component.

6. The motorcycle fairing cover of claim 5, wherein the at least one fastener is selected from the group consisting of: drawstring(s) and hook and loop straps, and the motorcycle component is a handlebar.

7. The motorcycle fairing cover of claim 5, wherein the at least one fastener is selected from the group consisting of: snaps, clips, buckles and the motorcycle component is the motorcycle fairing.

8. The motorcycle fairing cover of claim 1, further comprising reinforcing cording, taping or a combination of taping and cording at the periphery of the stretch-recovery fabric.

9. The motorcycle fairing cover of claim 8, wherein the at least one anti-skid patch is appended to the reinforcing cording, taping or a combination of taping and cording at the periphery of the stretch-recovery fabric.

10. The motorcycle fairing cover of claim 1, further comprising reinforcing cording, taping or a combination of taping and cording at an edge surface of the opening.

11. The motorcycle fairing cover of claim 1, wherein the stretch recover fabric in its stretched condition is adapted for covering the motorcycle fairing having a batwing configuration.

12. The motorcycle fairing cover of claim 1, wherein the outer periphery of the stretch-recovery fabric is substantially oval or ovoid.

13. The motorcycle fairing cover of claim 1, wherein the anti-skid patch comprises rubber.

* * * * *